United States Patent
Zou et al.

(10) Patent No.: US 10,394,357 B2
(45) Date of Patent: Aug. 27, 2019

(54) TOUCH DISPLAY PANEL AND TOUCH DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Zongjun Zou, Xiamen (CN); Ying Sun, Xiamen (CN); Yumin Xu, Xiamen (CN)

(73) Assignees: Xiamen Tianma Micro-Electronics Co., Ltd., Ziamen (CN); Tianma Micro-Electronics Co., Ltd., Shenzhen (CN)

( * ) Notice: Subject to any disclaimer, the term of this patent is extended or adjusted under 35 U.S.C. 154(b) by 128 days.

(21) Appl. No.: 15/414,623

(22) Filed: Jan. 25, 2017

(65) Prior Publication Data

US 2017/0131816 A1    May 11, 2017

(30) Foreign Application Priority Data

Sep. 14, 2016 (CN) .......................... 2016 1 0822850

(51) Int. Cl.
*G06F 3/041* (2006.01)
*G06F 3/044* (2006.01)
(52) U.S. Cl.
CPC ............ *G06F 3/0412* (2013.01); *G06F 3/044* (2013.01); *G06F 2203/04112* (2013.01)

(58) Field of Classification Search
CPC .................. G06F 3/0412; G06F 3/044; G06F 2203/04112
See application file for complete search history.

(56) References Cited

U.S. PATENT DOCUMENTS

| 2014/0240616 A1* | 8/2014 | Huang | .................. G06F 1/1692 349/12 |
| 2015/0029148 A1* | 1/2015 | Wang | .................... G06F 3/0412 345/174 |
| 2016/0162084 A1* | 6/2016 | Wang | .................... G06F 3/0412 345/173 |

FOREIGN PATENT DOCUMENTS

JP   3179136 U   10/2012

* cited by examiner

*Primary Examiner* — Towfiq Elahi
(74) *Attorney, Agent, or Firm* — Kilpatrick Townsend & Stockton LLP

(57) ABSTRACT

The present application discloses a touch display panel and a touch display device. An embodiment of the touch display panel includes: a first touch electrode array, comprising M first touch electrodes including $1^{st}$ to $M^{th}$ first touch electrodes, arranged along a first direction; and a second touch electrode array, comprising N second touch electrodes; each of the first touch electrodes comprising a first connection portion extending along the second direction, and each of the $2^{nd}$ to $M^{th}$ first touch electrodes further comprising a plurality of first electrode blocks; and an orthographic projection of each of the first electrode blocks on the second touch electrode array at least partially overlapping at least two second touch electrodes. The embodiment has improved touch detection accuracy.

19 Claims, 14 Drawing Sheets

TOUCH DISPLAY PANEL AND TOUCH DISPLAY DEVICE

CROSS-REFERENCE TO RELATED APPLICATIONS

This application is related to and claims priority from Chinese Patent Application No. 201610822850.9, filed on Sep. 14, 2016, entitled "Touch Display Panel and Touch Display Device," the entire disclosure of which is hereby incorporated by reference for all purposes.

TECHNICAL FIELD

The present application generally relates to the field of display technology, and particularly to a touch display panel and a touch display device.

BACKGROUND

Touch display devices may detect the coordinates of a finger in the plane of the display screen in the touch display device by using touch electrodes, and correspondingly display according to the coordinates.

In existing touch display devices, the touch function is mainly implemented by two touch electrode layers, each touch electrode layer including a plurality of touch electrodes disposed in parallel with each other, and the two touch electrode layers being orthogonal to each other. Touch excitation signals are applied to touch electrodes in one touch electrode layer. When a person's finger touches the screen of the touch display device, a coupling capacitor is formed between the finger and some touch electrodes on the screen, and a leakage current flows out from the coupling capacitor. A touch detection circuit determines, by detecting the leakage current, two orthogonal touch electrodes in the two touch electrode layers that form a coupling capacitor with the finger, so as to determine the touch position.

Referring to FIG. 1, a schematic structural diagram of a conventional touch display device is shown.

A touch transmitting electrode layer 110 includes a plurality of strip-shaped touch transmitting electrodes 111. A touch sensing electrode layer 120 includes a plurality of bar-shaped touch sensing electrodes 121. The extension direction of the touch transmitting electrode 111 is orthogonal to the extension direction of the touch sensing electrode 121, and each touch transmitting electrode 111 overlaps partially each touch sensing electrode 121. That is, each of the touch transmitting electrodes 111 forms a capacitor with each of the touch sensing electrodes 121 at the overlap. The touch position is detected according to the variation in capacitance.

In addition, the touch display device further includes an integrated circuit (IC) 130. Each touch transmitting electrode 111 is electrically connected to the IC 130 through a touch scan signal line 112, and receives a touch scan signal that is output by the IC 130. Each touch sensing electrode 121 is electrically connected to the IC 130 through a touch sensing signal line 122, and sends a collected touch sensing signal to the IC 130.

However, when an architecture as shown in FIG. 1 is used, if the screen size of the touch display device is large, a large number of touch transmitting electrodes and touch sensing electrodes need to be provided in order to ensure certain touch detection accuracy. As a result, the number of touch scan signal lines connected between the touch transmitting electrodes and the integrated circuit increases accordingly, and the number of touch sensing signal lines connected between the touch sensing electrodes and the integrated circuit also increases accordingly. Consequently, the touch scan signal lines and/or the touch sensing signal lines require more space, leading to an increase in the bezel width of the touch display device, which is contrary to the current development trend toward narrow-bezel display devices.

SUMMARY

In view of the above-mentioned defects or deficiencies in the related art, it is desirable to provide a touch display panel and a touch display device, so as to solve the technical problem in the related art.

According to a first aspect, an embodiment of the present application provides a touch display panel, comprising: a first touch electrode array, comprising M first touch electrodes including $1^{st}$ to $M^{th}$ first touch electrodes, arranged along a first direction; and a second touch electrode array, comprising N second touch electrodes including $1^{st}$ to $N^{th}$ second touch electrodes, arranged along a second direction, each of the first touch electrodes comprising a first connection portion extending along the second direction, and each of the $2^{nd}$ to $M^{th}$ first touch electrodes further comprising a plurality of first electrode blocks; the first electrode blocks in any one of the $2^{nd}$ to $M^{th}$ first touch electrodes formed on a same side of the first connection portion of the any one of the $2^{nd}$ to $M^{th}$ first touch electrode; and an orthographic projection of each of the first electrode blocks on the second touch electrode array at least partially overlapping at least two second touch electrodes.

According to a second aspect, an embodiment of the present application also provides a touch display device, comprising the touch display panel described above.

According to some embodiments, because the orthographic projection of each first electrode block in the first touch electrode on the second touch electrode array at least partially overlaps at least two second touch electrodes, the touch detection accuracy of the touch display panel can be improved. On the other hand, the number of the first touch electrodes and/or second touch electrodes that need to be provided can be reduced while ensuring a certain touch detection accuracy of the touch display panel, and the number of signal lines electrically connected to the first touch electrodes and/or the second touch electrodes also decreases accordingly. In this way, the number of wirings in the touch display panel is reduced, which complies with the development trend toward narrow-bezel display devices.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only certain features are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 2:
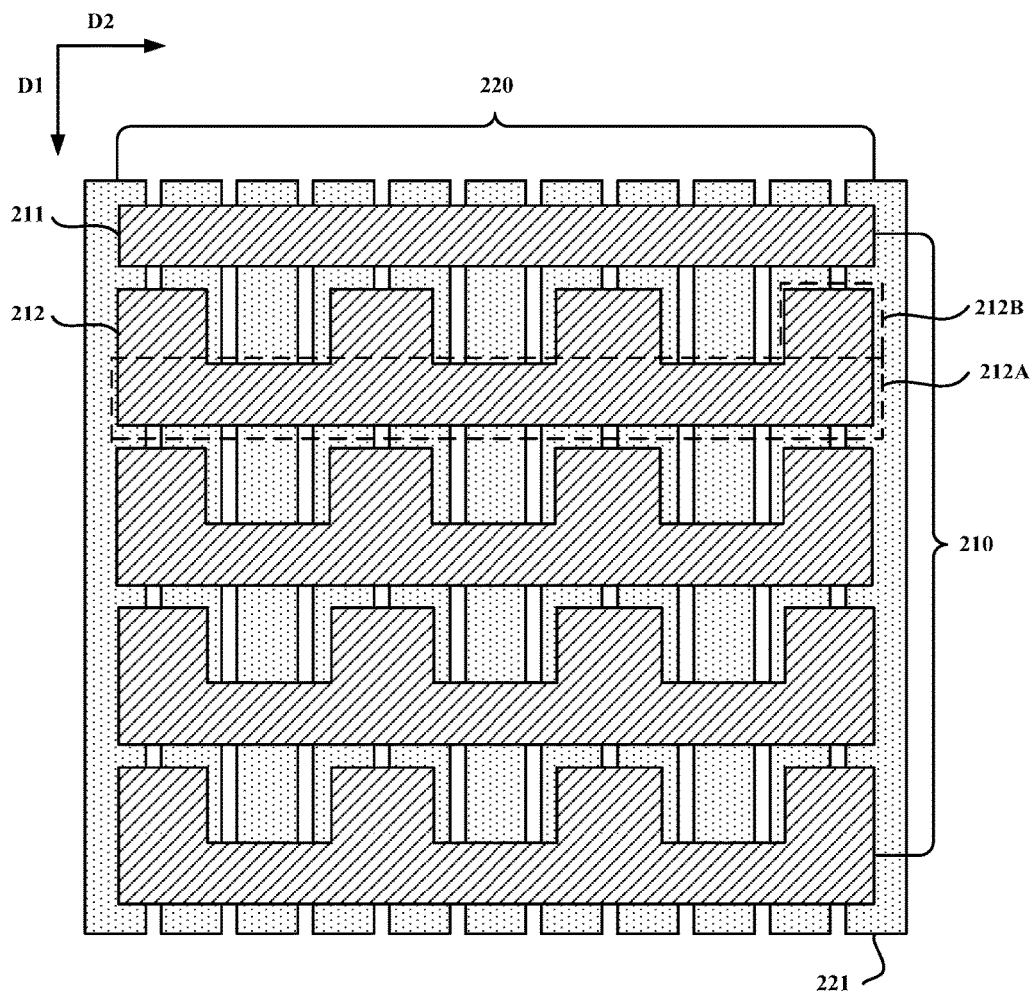
FIG. 2 is a schematic structural diagram illustrating a relative position relationship between a first touch electrode array and a second touch electrode array in a touch display panel according to an embodiment of the present application.

Referring to FIG. 2, FIG. 2 is a schematic structural diagram illustrating a relative position relationship between a touch transmitting electrode array and a touch sensing electrode array in an integrated touch display panel according to an embodiment of the present application.

The touch display panel of the present application includes a first touch electrode array 210 and a second touch electrode array 220.

The first touch electrode array 210 includes M first touch electrodes, $1^{st}$ to $M^{th}$ first touch electrodes, arranged along a first direction D1. M is an integer larger than 2. The $1^{st}$ first touch electrode arranged along the first direction D1 is as denoted by the reference numeral 211 in FIG. 2, and the $2^{nd}$ to $M^{th}$ first touch electrodes are as denoted by the reference numeral 212 in FIG. 2.

The second touch electrode array 220 includes N second touch electrodes 221, $1^{st}$ to $N^{th}$ second touch electrodes, arranged along the second direction D2.

Each of the first touch electrodes 211 and 212 includes a first connection portion 212A extending along the second direction D2, and each of the $2^{nd}$ to $M^{th}$ first touch electrodes 212 further includes a plurality of first electrode blocks 212B. The first electrode blocks 212B and the first connection portion 212A of a same first touch electrode 212 may be electrically connected to each other in any manner, including, but not limited to, by direct contact, by a conductor disposed at the same layer as the first connection portion 212A and the first electrode blocks 212B, and/or by a conductor (for example, a metal wire) disposed at a different layer from the first connection portion 212A and the first electrode blocks 212B.

The first electrode blocks 212B of any one of the $2^{nd}$ to $M^{th}$ first touch electrodes 212 are formed at the same side of the first connection portion 212A of the first touch electrode.

In addition, in this embodiment, an orthographic projection of each of the first electrode blocks 212B on the second touch electrode array 220 at least partially overlaps at least two second touch electrodes 221.

In the touch display panel of this embodiment, each of the $2^{nd}$ to $M^{th}$ first touch electrodes in the first touch electrode array is provided with a plurality of first electrode blocks; therefore, compared with an existing bar-shaped first touch electrode, when a finger touches a position corresponding to the first electrode block, the touch of the finger can be detected by way of a coupling capacity formed between the first electrode block and the second touch electrode, thereby improving the touch detection accuracy.

Further, as shown in FIG. 2, because the orthographic projection of the first electrode block 212B on the second touch electrode array 220 at least partially overlaps at least two second touch electrodes 221, when a finger touches a position corresponding to the first electrode block, it may be further determined, based on the change in the capacitance of a coupling capacity between the first electrode block and the at least two second touch electrodes that at least partially overlap the first electrode block, that the touch position is located at the overlap between the first electrode block and which second touch electrode, thereby further improving the touch detection accuracy.

Figure 3:
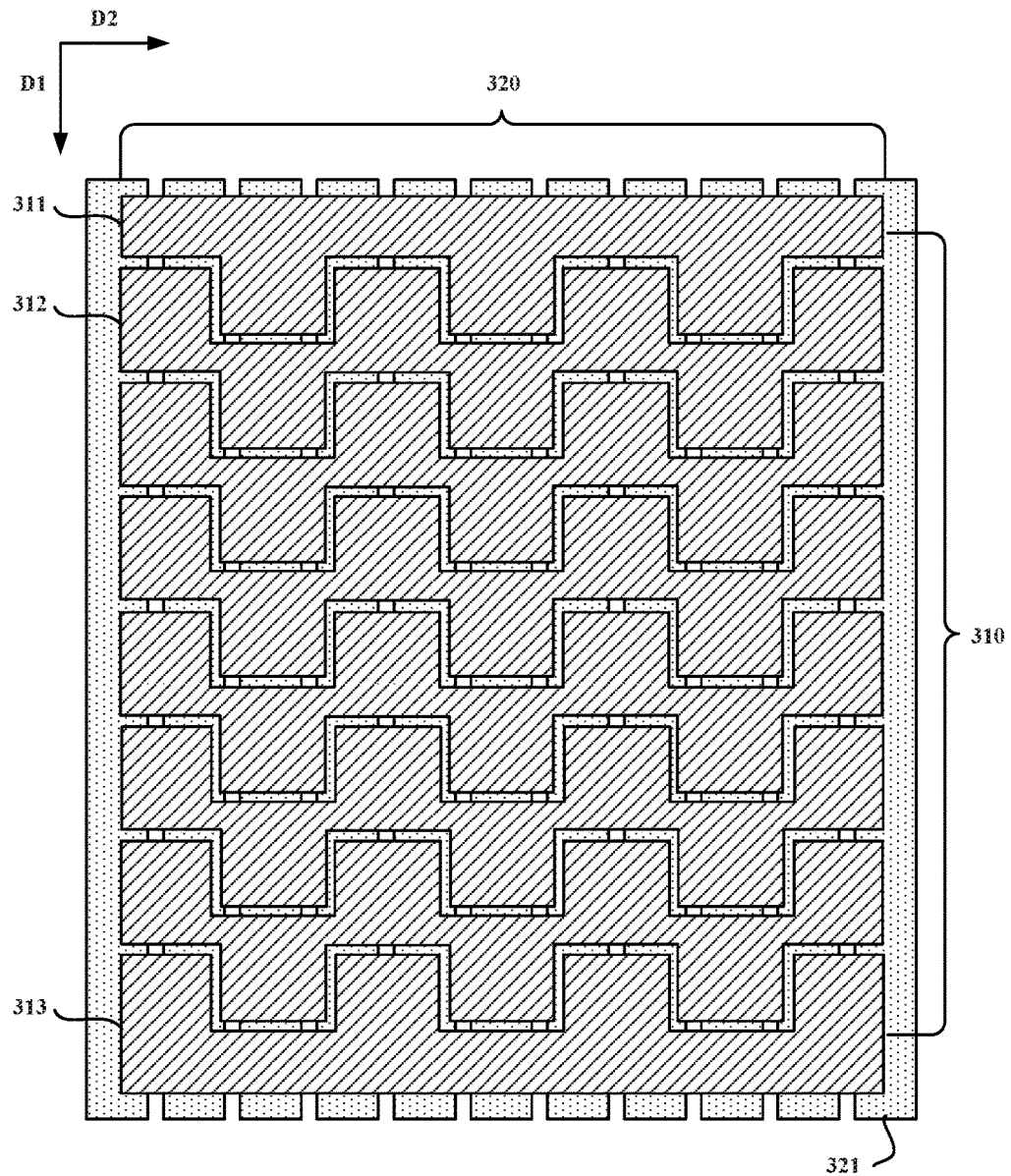
FIG. 3 is a schematic structural diagram illustrating a relative position relationship between a first touch electrode array and a second touch electrode array in a touch display panel according to another embodiment of the present application.
Figure 4:
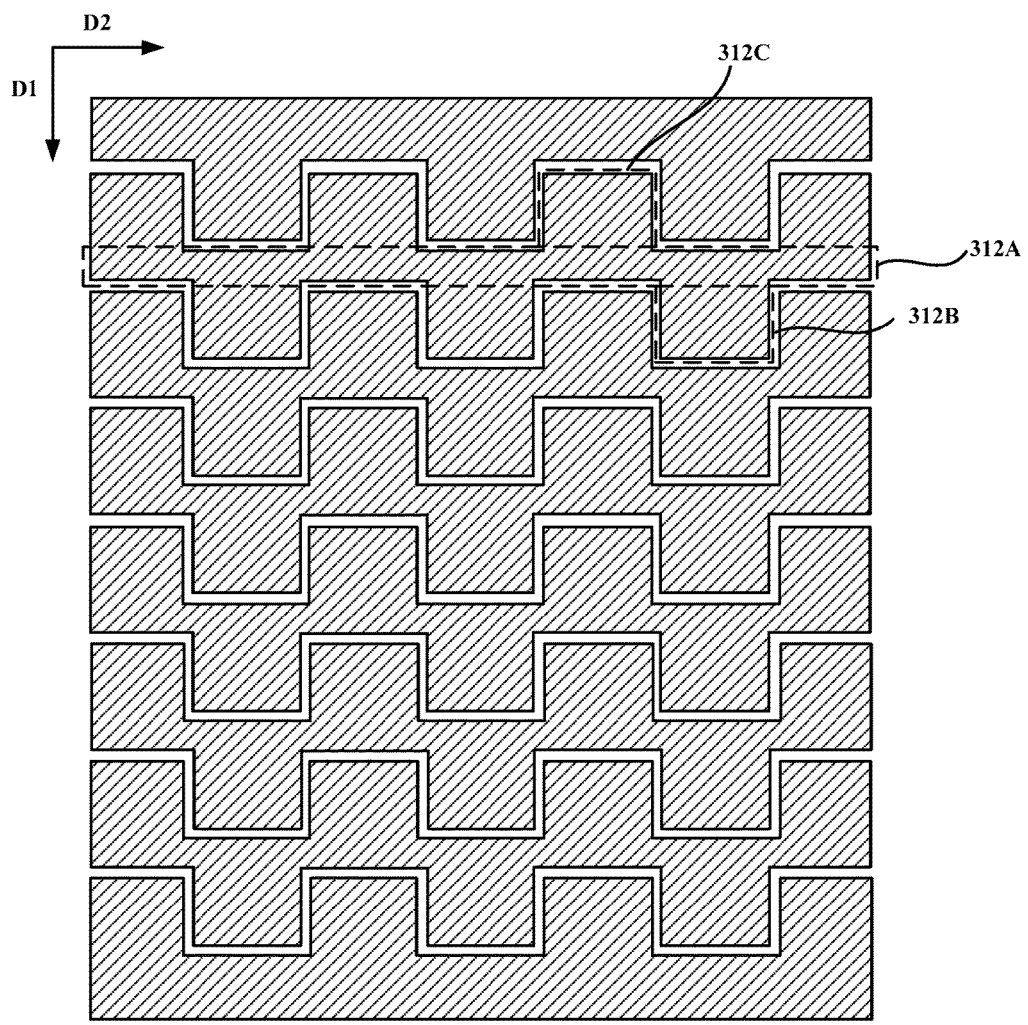
FIG. 4 is a schematic structural diagram of the first touch electrode array in the embodiment shown in FIG. 3.

Referring to FIG. 3, FIG. 3 is a schematic structural diagram illustrating the relative position relationship between a touch transmitting electrode array and a touch sensing electrode array in a touch display panel according to another embodiment of the present application. FIG. 4 is a schematic structural diagram of the first touch electrode array in the embodiment shown in FIG. 3.

This embodiment will be described below with reference to FIG. 3 and FIG. 4. The description focuses on the differences between this embodiment and the embodiment shown in FIG. 2, and at least some of the same parts will not be repeatedly described in detail here.

In FIG. 3, the reference numeral 311 denotes the $1^{st}$ first touch electrode in the first touch electrode array, the reference numeral 312 denotes the $2^{nd}$ to $(M-1)^{th}$ first touch electrodes in the first touch electrode array, and the reference numeral 313 denotes the $M^{th}$ first touch electrode in the first touch electrode array.

In this embodiment, each of the $1^{st}$ to $(M-1)^{th}$ first touch electrodes further includes a plurality of second electrode blocks. As shown in FIG. 4, in the $2^{nd}$ to $(M-1)^{th}$ first touch electrodes, the second electrode blocks 312C and the first electrode block 312B of a same first touch electrode are respectively located on opposite sides of the first connection portion 312A of the first touch electrode.

In the touch display panel of this embodiment, because each of the $2^{nd}$ to $M^{th}$ first touch electrodes in the first touch electrode array is provided with a plurality of first electrode blocks, and each of the $1^{st}$ to $(M-1)^{th}$ first touch electrodes is provided with a plurality of second electrode blocks, when a finger touches a position corresponding to the first electrode block or the second electrode block, the touch of the finger can be detected by means of a coupling capacity formed between the first electrode block or the second electrode block and the second touch electrode, thereby improving the touch detection accuracy.

Further, the orthographic projections of the first electrode block 312B and the second electrode block 312C on the second touch electrode array 320 at least partially overlap at least two second touch electrodes 321; therefore, when a finger touches a position corresponding to the first electrode block 312B or the second electrode block 312C, it may be further determined, based on a change in the capacitance of a coupling capacity between the first electrode block or the second electrode block and at least two second touch electrodes that at least partially overlap the first electrode block or the second electrode block, that the touch position is located at the overlap between the first electrode block or the second electrode block and which second touch electrode, thereby further improving the touch detection accuracy.

In addition, in some optional implementations of this embodiment, as shown in FIG. 4, in the first touch electrode array, one second electrode block of the $(i+1)^{th}$ first touch electrode is formed between any two neighboring first electrode blocks of the $i^{th}$ first touch electrode, wherein i is an integer, and $1 \le i \le M-1$. Similarly, one first electrode block of the $(j-1)^{th}$ first touch electrode is formed between any two neighboring second electrode blocks of the $j^{th}$ first touch electrode, wherein j is an integer, and $2 \le j \le M$. In this way, two neighboring first touch electrodes can be embedded into each other, so that the first touch electrode array can cover a larger area on the touch display panel, thereby further improving the touch detection accuracy.

It should be noted here that in this embodiment, the first electrode block and the second electrode block may be substantially congruent. In some optional implementations, the first electrode block and the second electrode block may be of a first shape. The first shape may include, for example, but not limited to, a rectangle, an arc, a triangle, and a trapezoid. The first electrode block 312B may have a first edge extending along the second direction D2 and joined to the first connection portion 312A, the second electrode block 312C may have a second edge extending along the second direction D2 and joined to the first connection portion 312A, and the length of the first edge is equal to the length of the second edge. In this way, the first electrode block 312B and the second electrode block 312C are substantially congruent, and are joined to the first connection portion 312A in a same manner, so that the pattern to be etched in the patterning process step for fabricating the first touch electrode is simple, thereby reducing the difficulty of the patterning process and improving the production yield of the first touch electrode.

In addition, in some optional implementations of this embodiment, the first electrode blocks of a same first touch electrode are evenly distributed, and the second electrode blocks of a same first touch electrode are evenly distributed. That is to say, in these optional implementations, any two neighboring first electrode blocks of a same first touch electrode have a same spacing, and any two neighboring second electrode blocks of a same first touch electrode have a same spacing. In addition, in some application scenarios, the spacing between any two neighboring first electrode blocks of a same first touch electrode may be greater than the width of the second electrode block in the second direction D2, and the spacing between any two neighboring second electrode blocks of a same first touch electrode may be greater than the width of the first electrode block in the second direction D2, so that neighboring first touch electrodes can be embedded into each other, thereby further improving the touch detection accuracy of the touch display panel.

Figure 5:
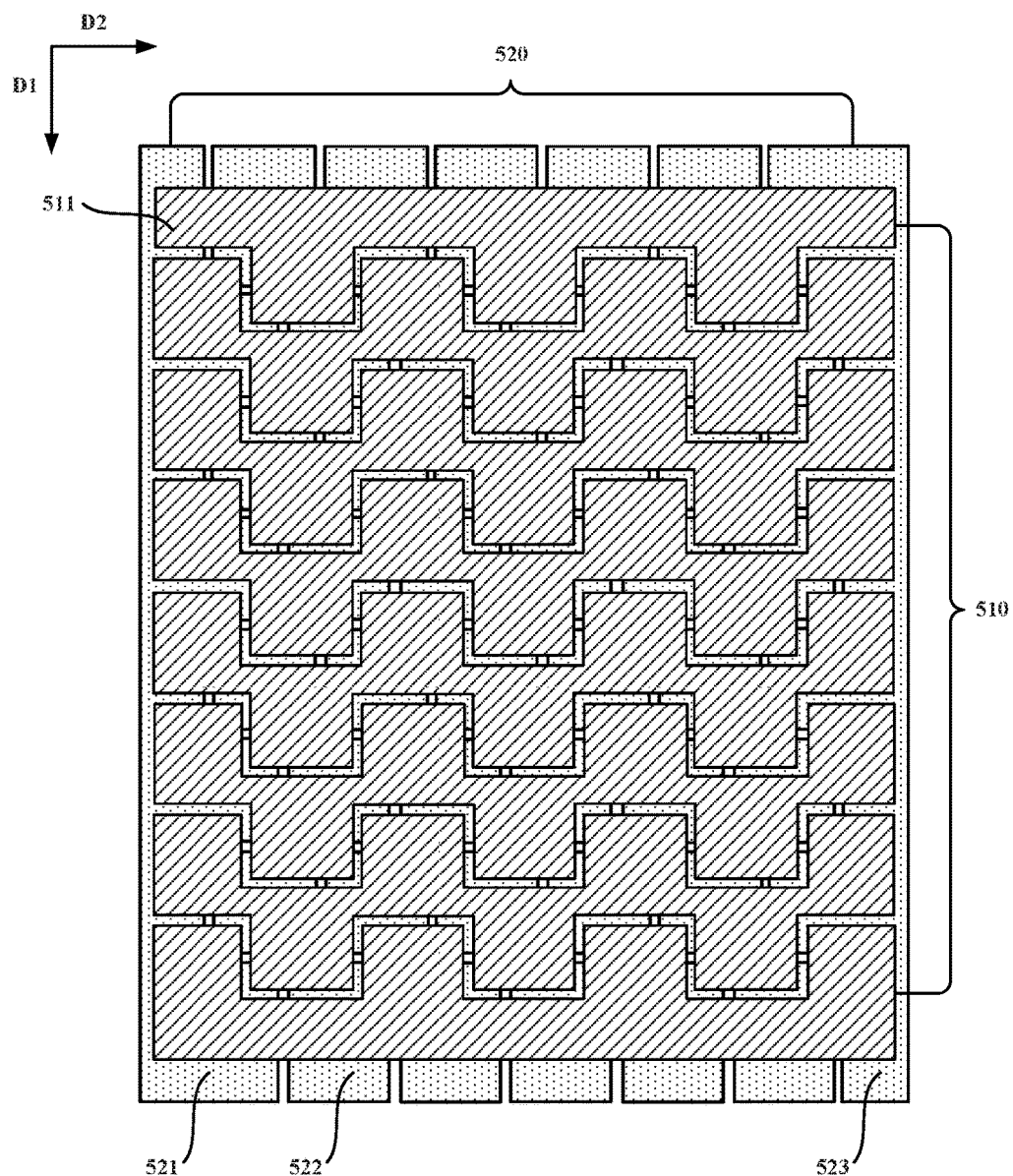
FIG. 5 is a schematic structural diagram illustrating a relative position relationship between a first touch electrode array and a second touch electrode array in a touch display panel according to still another embodiment of the present application.
Figure 6:
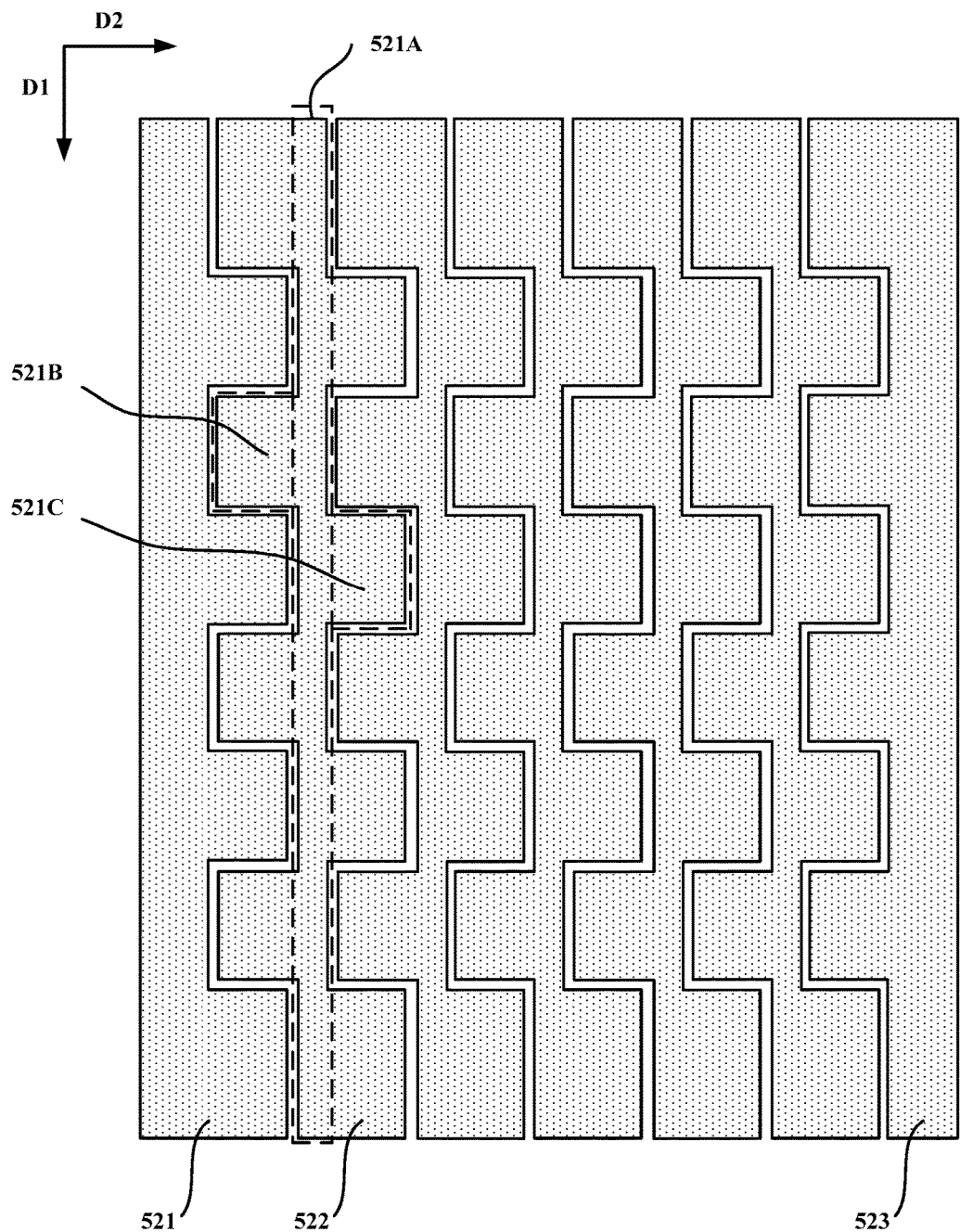
FIG. 6 is a schematic structural diagram of the second touch electrode array in the embodiment shown in FIG. 5.

Referring to FIG. 5, FIG. 5 is a schematic structural diagram illustrating the relative position relationship between a first touch electrode array and a second touch electrode array in a touch display panel according to still another embodiment of the present application. FIG. 6 is a schematic structural diagram of the second touch electrode array in the embodiment shown in FIG. 5.

This embodiment will be described below with reference to FIG. 5 and FIG. 6. The description focuses on the differences between this embodiment and the embodiments shown in FIG. 3 and FIG. 4, and certain aspects will not be repeatedly described in detail here.

In this embodiment, each first touch electrode 511 in the first touch electrode array 510 has a structure similar to that in the embodiment shown in FIG. 3, and certain details will not be repeatedly described here.

Different from the embodiment shown in FIG. 3, in this embodiment, as shown in FIG. 5 and FIG. 6, each of the second touch electrodes (the $1^{st}$ second touch electrode denoted by the reference numeral 521, the $2^{nd}$ to $(N-1)^{th}$ second touch electrodes denoted by the reference numeral 522, and the $N^{th}$ second touch electrode denoted by the reference numeral 523 as shown in FIG. 5) further includes a second connection portion 521A, each of the $2^{nd}$ to $N^{th}$ second touch electrodes further includes third electrode blocks 521B. The third electrode blocks 521B of any one of the $2^{nd}$ to $N^{th}$ second touch electrodes are formed on a same side of the second connection portion 521A of the second touch electrode, and the orthographic projection of a third electrode block 521B on the first touch electrode array 510 at least partially overlaps at least two first touch electrodes 511. In this way, because the orthographic projection of the third electrode block 521B on the first touch electrode array 510 at least partially overlaps at least two first touch electrodes 511, when a finger touches a position corresponding to the third electrode block 521B, it may be further determined, based on a change in the capacitance of a coupling capacity between the third electrode block 521B and the at least two first touch electrodes that at least partially overlap the third electrode block 521B, that the touch position is located at the overlap between the third electrode block 521B and which first touch electrode, thereby further improving the touch detection accuracy.

Further, in this embodiment, each of the $1^{st}$ to $(N-1)^{th}$ second touch electrodes further includes a plurality of fourth electrode blocks 521C. In the $2^{nd}$ to $(N-1)^{th}$ second touch electrodes, the third electrode block and the fourth electrode blocks of a same second touch electrode are respectively located on opposite sides of the second connection portion of the second touch electrode.

In this way, because the orthographic projections of the third electrode block 521B and the fourth electrode block 521C on the first touch electrode array 510 at least partially overlap at least two first touch electrodes 511, when a finger touches a position corresponding to the third electrode block 521B or the fourth electrode block 521C, it may be further determined, based on a change in the capacitance of a coupling capacity between the third electrode block 521B or the fourth electrode block 521C and the at least two first touch electrodes 511 that at least partially overlap the third electrode block 521B or the fourth electrode block 521C, that the touch position is located at the overlap between the third electrode block 521B or the fourth electrode block 521C and which first touch electrode 511, thereby further improving the touch detection accuracy.

In addition, in some optional implementations of this embodiment, as shown in FIG. 6, in the second touch electrode array, one fourth electrode block of the $(k-1)^{th}$ second touch electrode is formed between any two neighboring third electrode blocks of the $k^{th}$ second touch electrode, wherein k is an integer, and $2 \leq k \leq N$. Similarly, one third electrode block of the $(p+1)^{th}$ second touch electrode is formed between any two neighboring fourth electrode blocks of the $p^{th}$ second touch electrode, wherein p is an integer, and $1 \leq p \leq N-1$. In this way, two neighboring second touch electrodes can be embedded into each other, so that the second touch electrode array can cover a larger area of the touch display panel, thereby further improving the touch detection accuracy.

It should be noted here that in this embodiment, the third electrode block and the fourth electrode block may be substantially congruent. In some optional implementations, the third electrode block and the fourth electrode block may be of a first shape. The first shape may include, for example, but not limited to, a rectangle, an arc, a triangle, and a trapezoid. The third electrode block 521B may have a first edge extending along the second direction D2 and joined to the first connection portion 312A, the fourth electrode block 521C may have a second edge extending along the second direction D2 and joined to the first connection portion 312A, and the length of the first edge is equal to the length of the second edge. In this way, the third electrode block 521B and the fourth electrode block 521C are substantially congruent, and are joined to the first connection portion 312A in the same manner, so that the pattern to be etched in the patterning process step for fabricating the first touch electrode is simple, thereby reducing the difficulty of the patterning process and improving the production yield of the first touch electrode.

In the above-mentioned embodiments, the first connection portion, the first electrode block, and the second electrode block of the first touch electrode may be made of a transparent conductive glass, for example, ITO (indium tin oxide), and the second connection portion, the third electrode block, and the fourth electrode block of the second touch electrode may also be made of ITO. To reduce the resistance of the first touch electrode and/or the second touch electrode, metal wirings in parallel with the first touch electrodes and/or the second touch electrodes may be disposed in a metal layer, thereby achieving the objective of reducing the resistance of the first touch electrode and/or the second touch electrode.

Alternatively, to achieve a desired resistance of the first touch electrode and/or the second touch electrode, the sizes of the first connection portion, the first electrode block, and the second electrode block of the first touch electrode and/or the sizes of the second connection portion, the third electrode block, and the fourth electrode block of the second touch electrode may be determined.

Figure 7:
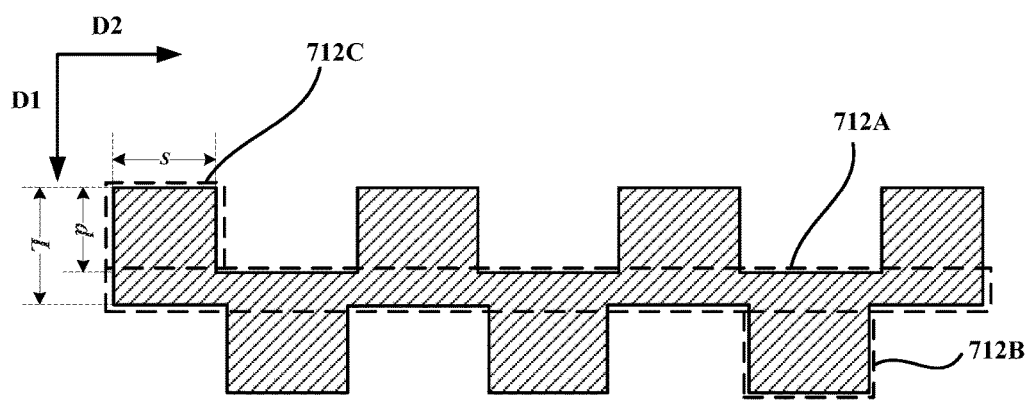
FIG. 7 is a schematic structural diagram of a first touch electrode in the embodiment shown in FIG. 5.

For example, as shown in FIG. 7, the first electrode block 712B and the second electrode block 712C have a width d along the first direction D1, the sum of the width of the first connection portion 712A along the first direction D1 and d is L, the length of the first edge is S, and $S=L$, and $d=(\frac{2}{3})L$.

Similarly, in the second touch electrode, the width $d_1$ of the third electrode block and the fourth electrode block along the second direction, the sum $L_1$ of the width of the second connection portion along the second direction and $d_1$, and the length $S_1$ of the first edge also satisfy:

$S_1=L_1$, and $d_1=(\frac{2}{3})L_1$.

In this way, neighboring first touch electrodes and neighboring second touch electrodes can be embedded into each other, thereby further improving the touch detection accuracy. On the other hand, the impact on the response speed due to the excessively large resistance of the first touch electrode and/or the second touch electrode when the width of the connection portion (for example, the width d of the first connection portion along the first direction and the width $d_1$ of the second connection portion along the second direction) is too small and the width of the electrode block (for example, the width of the first and second electrode blocks along the first direction and the width of the third and fourth electrode blocks along the second direction) is too large may be prevented.

Figure 1:
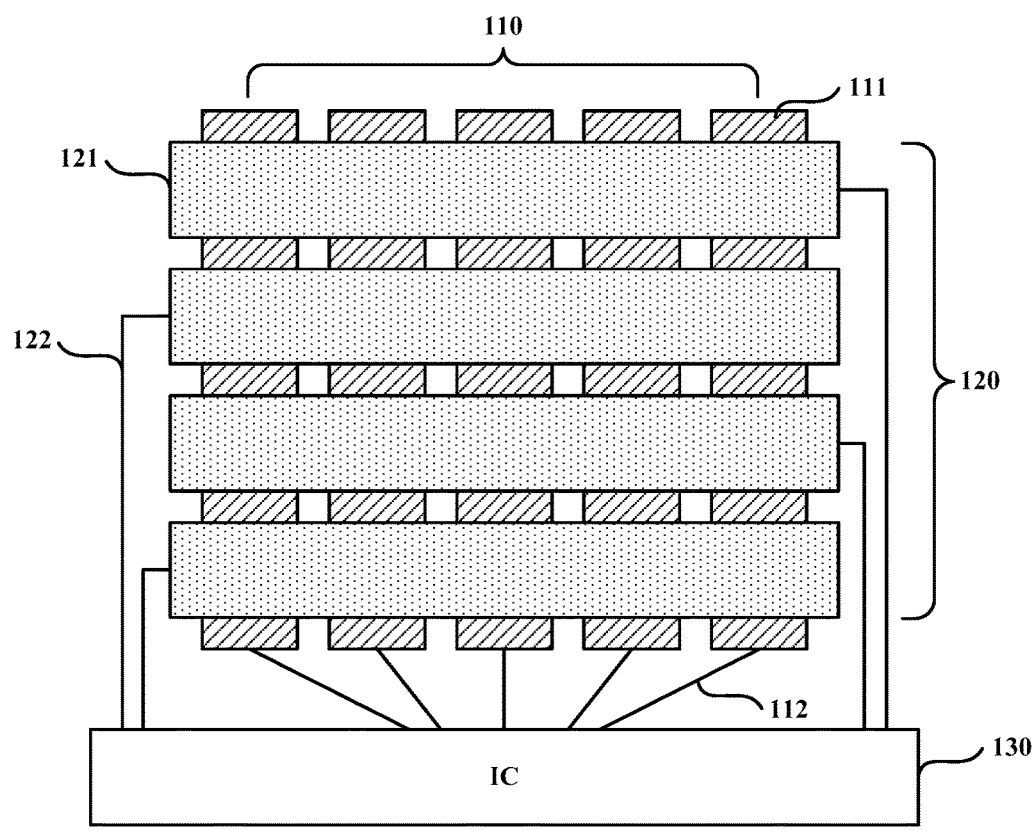
FIG. 1 is a schematic structural diagram of a conventional touch display device.

A comparison between the touch detection accuracy of the touch display panel of this embodiment and that of the touch display panel shown in FIG. 1 is schematically described below with reference to FIG. 8A to FIG. 8D.

Figure 8A:
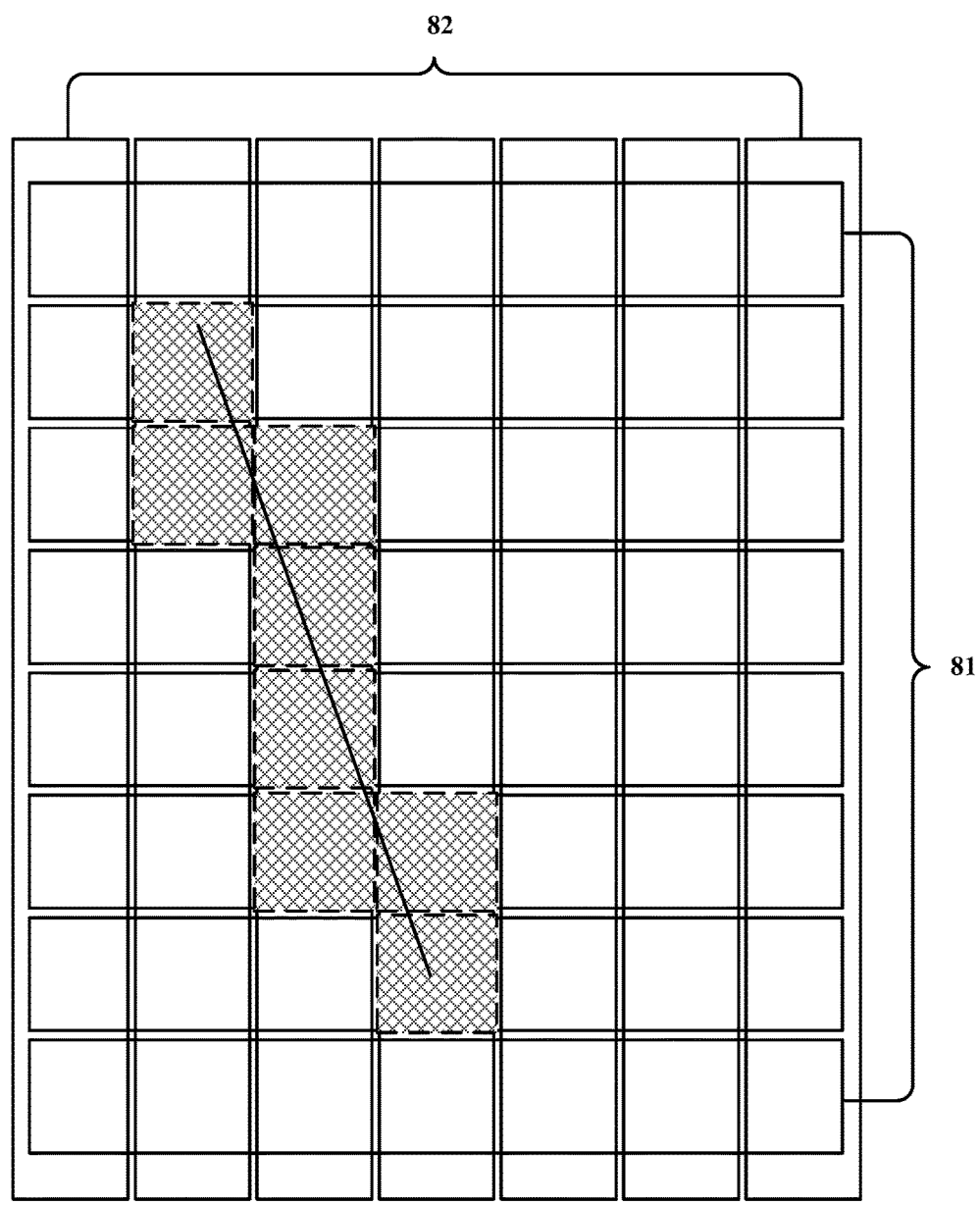
FIG. 8A to FIG. 8D are schematic diagrams illustrating reported point positions in the case of using the touch display panel of the embodiment shown in FIG. 5 and reported point positions in the case of using a touch display panel in the related art when the touch trajectory is a straight line segment and a circle.
Figure 8B:
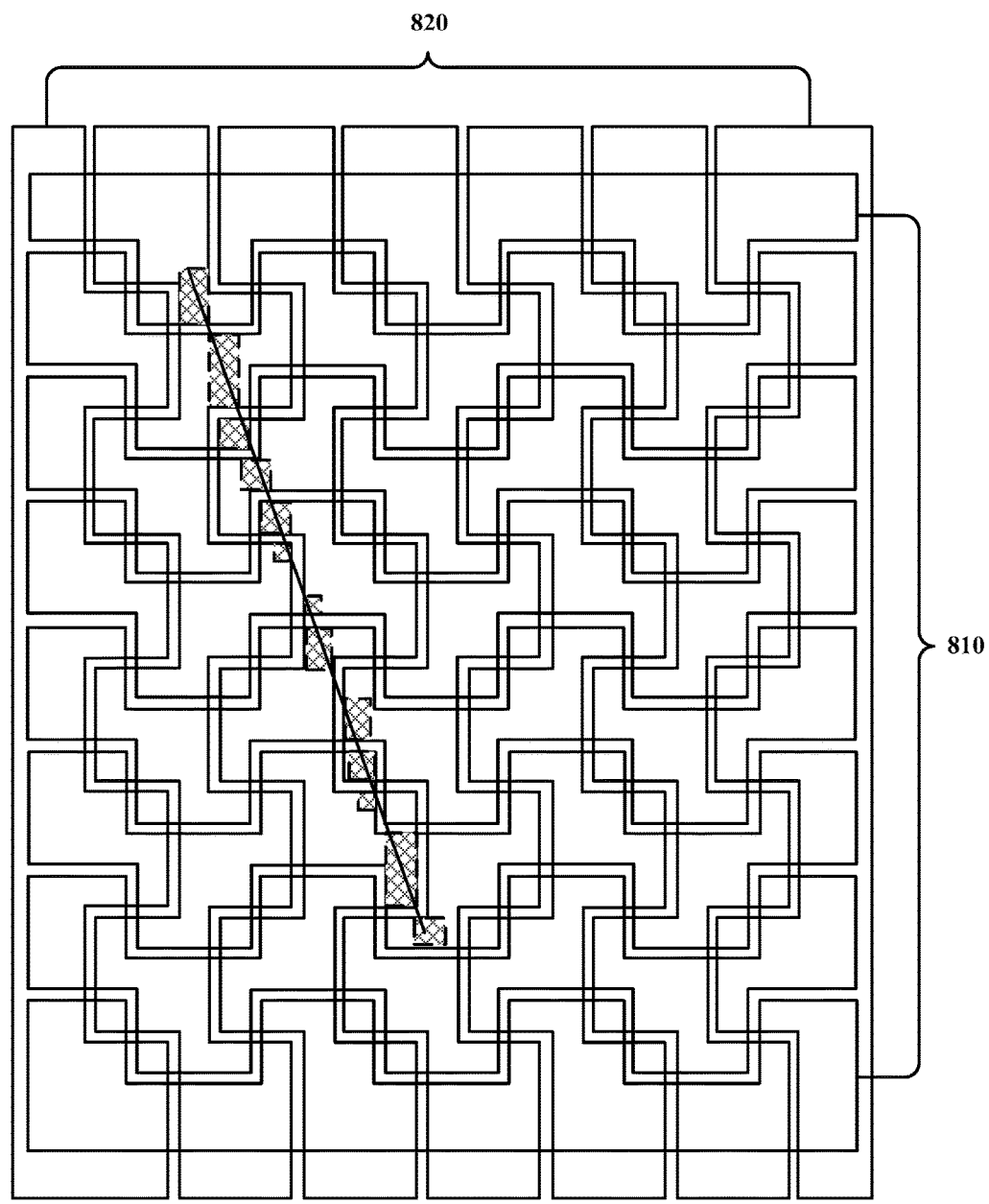

Referring to FIG. 8A and FIG. 8B, FIG. 8A and FIG. 8B respectively illustrates a comparison between the number of reported points in the case of using the touch display panel shown in FIG. 1 and that in the case of using the touch display panel shown in FIG. 5 when a movement trajectory of a finger or a passive stylus on the touch display panel is a straight line segment.

Specifically, as shown in FIG. 8A, when the first touch electrode array 81 and the second touch electrode array 82 in FIG. 8A are used for touch detection, and a movement trajectory of a finger or a passive stylus on the touch display panel is a straight line segment shown in FIG. 8A, 8 reported point positions are generated, i.e. the positions being shaded in FIG. 8A.

Further, as shown in FIG. 8B, when the first touch electrode array 810 and the second touch electrode array 820 in FIG. 8B are used for touch detection, and a movement trajectory of a finger or a passive stylus on the touch display panel is a same straight line segment as that shown in FIG. 8A, 13 reported point positions are generated, i.e. the positions being shaded in FIG. 8B.

As can be learned from the comparison between the number of reported point positions in FIG. 8A and the number of reported point positions in FIG. 8B, in the case of using the architecture of this embodiment formed by the first touch electrode array and the second touch electrode array, when a movement trajectory of a finger or a passive stylus on the touch display panel is the straight line segment shown in FIG. 8A and FIG. 8B, the number of reported point positions is increased by $(13-8)/8 \times 100\% = 67.5\%$.

Figure 8C:
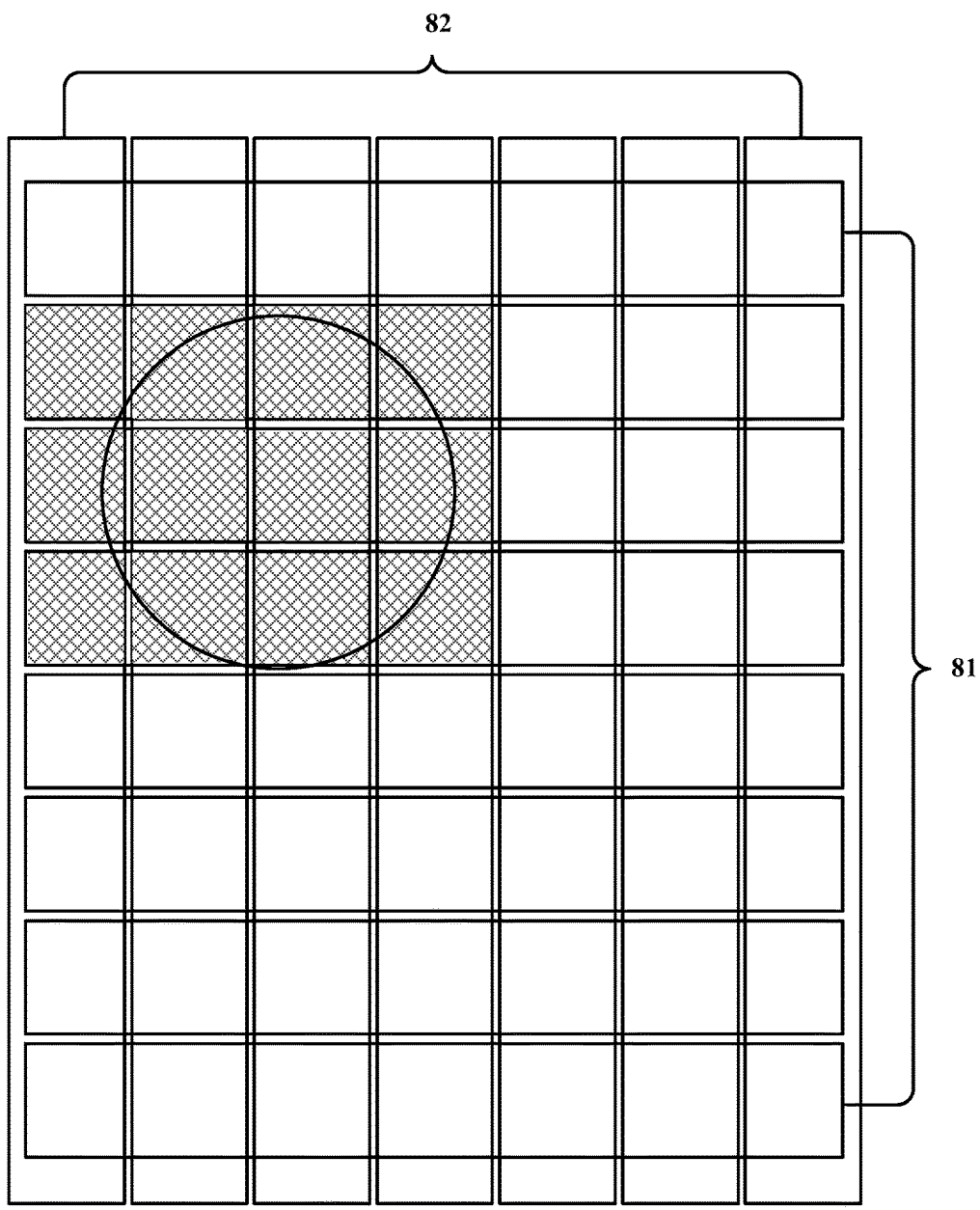
Figure 10:
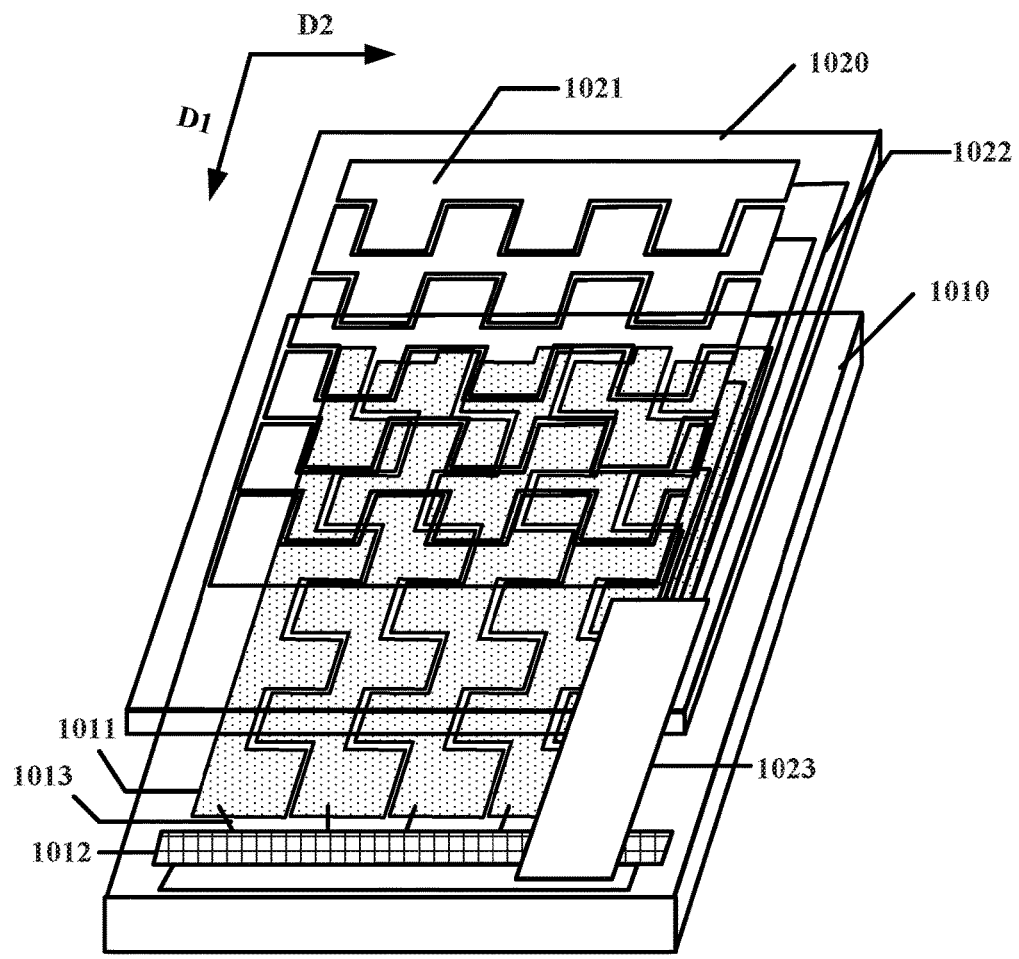
FIG. 10 is a schematic structural diagram of a touch display panel according to an embodiment of the present application.

Then, as shown in FIG. 8C, when the first touch electrode array 81 and the second touch electrode array 82 in FIG. 8C are used for touch detection, and a movement trajectory of a finger or a passive stylus on the touch display panel is a circle shown in FIG. 8C, 10 reported point positions are generated, i.e. the positions being shaded in FIG. 8C.

Figure 8D:
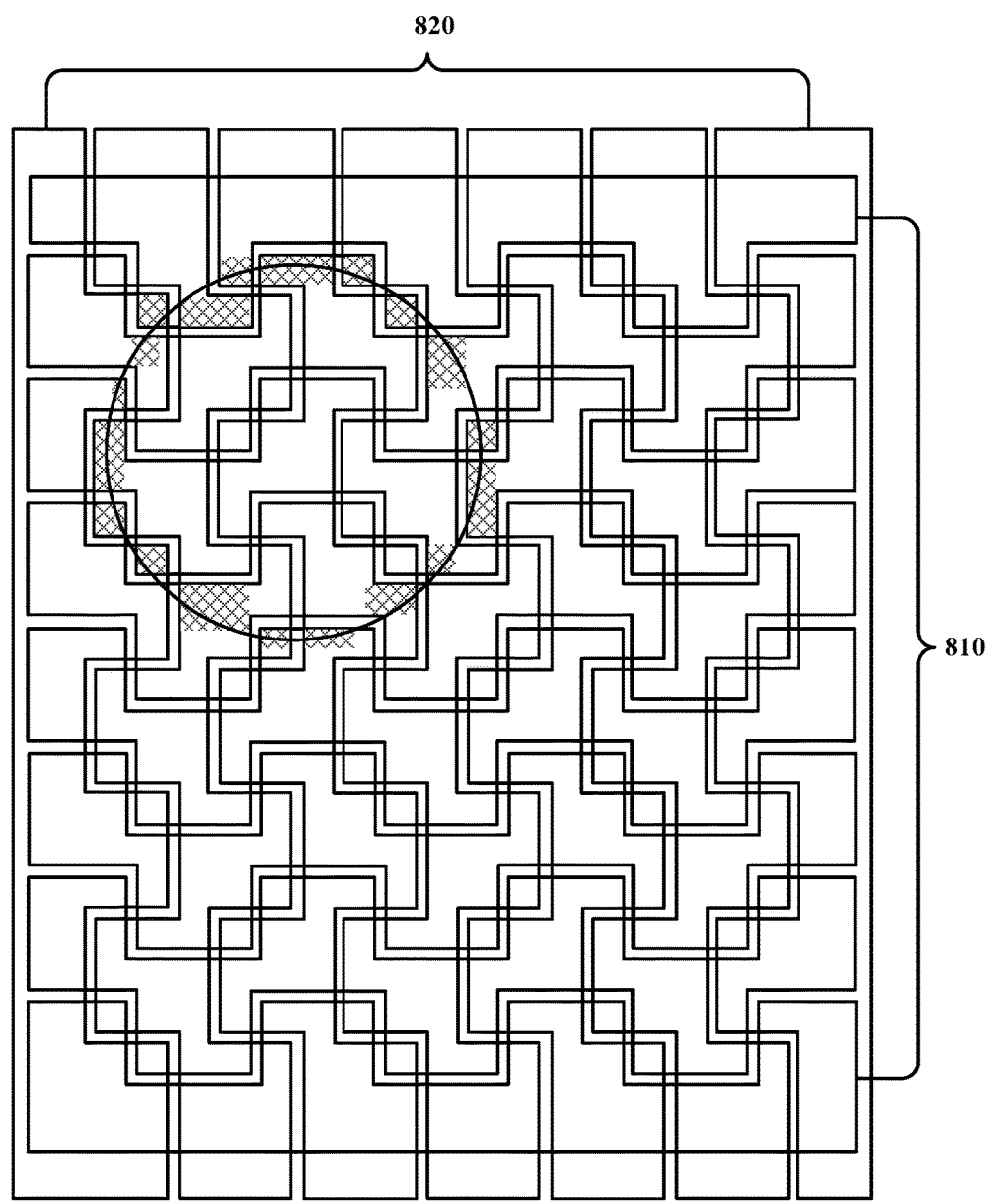

As shown in FIG. 8D, when the first touch electrode array 810 and the second touch electrode array 820 in FIG. 8D are used for touch detection, and a movement trajectory of a finger or a passive stylus on the touch display panel is a same circle as that shown in FIG. 8C, 18 reported point positions are generated, i.e. the positions being shaded in FIG. 8D.

As can be learned from the comparison between the number of reported point positions in FIG. 8C and the number of reported point positions in FIG. 8D, in the case of using the architecture of this embodiment formed by the first touch electrode array and the second touch electrode array, when a movement trajectory of a finger or a passive stylus on the touch display panel is the circle shown in FIG. 8C and FIG. 8D, the number of reported point positions is increased by (18−10)/10×100%=80%.

It should be appreciated by those skilled in the art that when the touch trajectory on the touch display panel varies, the number of reported point positions in the case of using the touch display panel shown in FIG. 1 and the number of reported point positions in the case of using the touch display panel of this embodiment also vary accordingly. However, it can be deduced by those skilled in the art that regardless of the specific pattern of the touch trajectory, using the architecture of this embodiment formed by the first touch electrode array and the second touch electrode array can significantly increase the number of reported point positions, and therefore can significantly improve the touch detection accuracy.

In some optional implementations, to reduce the resistance of the first touch electrode and/or the second touch electrode, in the embodiments of the present application, at least one of the first electrode block, the second electrode block, the third electrode block, and the fourth electrode block may be a metal mesh electrode. Compared with the use of ITO as the first electrode block, the second electrode block, the third electrode block, and the fourth electrode block, using a metal mesh electrode as the first electrode block, the second electrode block, the third electrode block, and the fourth electrode block can achieve a lower resistance, so that the first touch electrode and/or the second touch electrode has a higher response speed and less signal transmission loss.

In some other optional implementations, to further reduce the resistance of the first touch electrode and/or the second touch electrode, the first connection portion of the first touch electrode and/or the second connection portion of the second touch electrode may be made of metal mesh wires. In these optional implementations, the first connection portion, the first electrode block and the second electrode block are disposed at the same layer, and are all metal mesh electrodes; and/or the second connection portion, the third electrode block, and the fourth electrode block are disposed at the same layer, and are all metal mesh electrodes.

Figure 9:
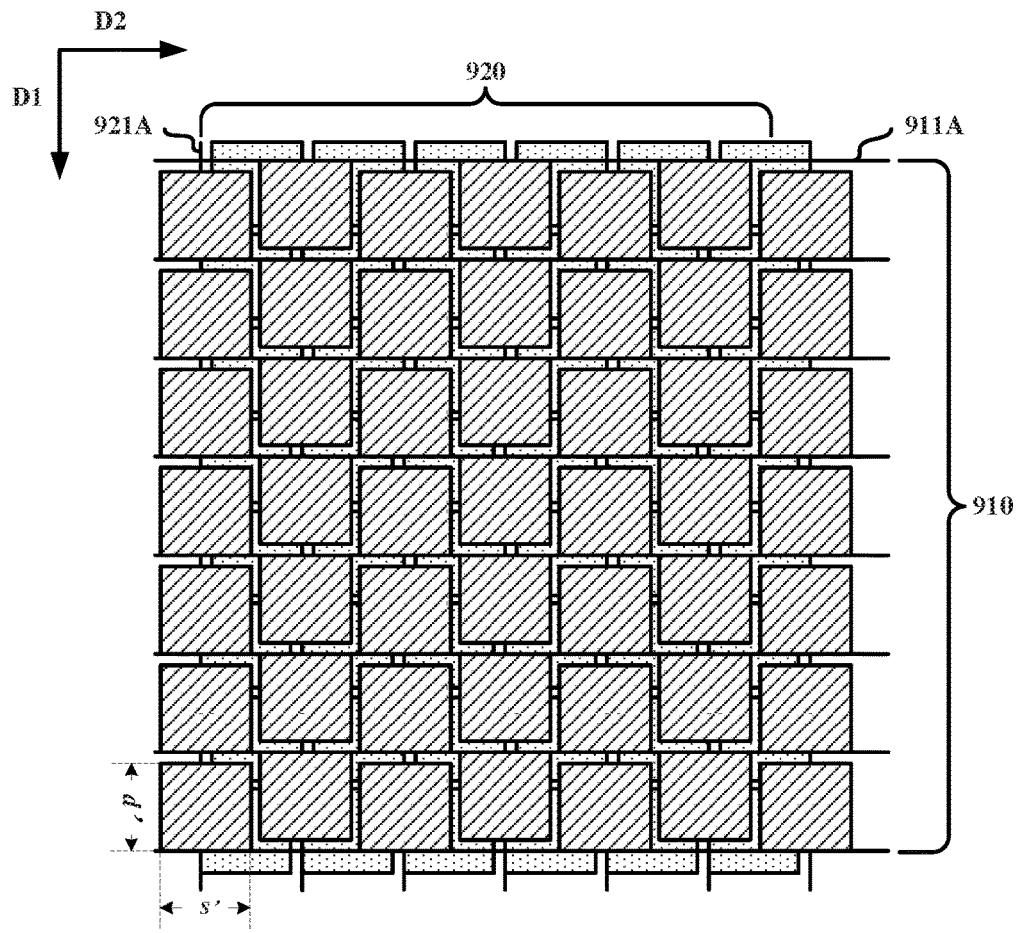
FIG. 9 is a schematic structural diagram illustrating a relative position relationship between a first touch electrode array and a second touch electrode array in a touch display panel according to yet another embodiment of the present application.

Referring to FIG. 9, FIG. 9 is a schematic structural diagram illustrating the relative position relationship between a first touch electrode array and a second touch electrode array in a touch display panel according to yet another embodiment of the present application.

Different from the embodiment shown in FIG. 5, in this embodiment, a first connection portion 911A of each first touch electrode in a first touch electrode array 910 and/or each second connection portion 921A of a second touch electrode array 920 are metal wires.

In this way, because the first connection portion 911A and/or the second connection portion 921A is a metal wire, the resistance of the first touch electrode and/or the second touch electrode can be reduced, so that the signal transmission rate of the first touch electrode and/or the second touch electrode is improved, thereby improving the touch detection sensitivity of the touch display panel of this embodiment.

In addition, in some optional implementations of this embodiment, at least one of the first electrode block, the second electrode block, the third electrode block, and the fourth electrode block may be a metal mesh electrode, so as to further reduce the resistance of the first touch electrode and/or the second touch electrode.

In this embodiment, as shown in FIG. 9, the first electrode block and the second electrode block have a width d' along the first direction, the length of the first edge is S', and d'=S'.

Similarly, the width d'' of the third electrode block and the fourth electrode block along the second direction and the length S' of the first edge may also satisfy: d''=S'.

In addition, the touch display panel of this embodiment of the present application further includes a plurality of first touch signal lines, a plurality of second touch signal lines, and an integrated circuit. A first end of each first touch signal line is correspondingly connected to one of the first touch electrodes in the first touch electrode array, and a second end of each first touch signal line is electrically connected to the integrated circuit. A first end of each second touch signal line is correspondingly connected to one of the second touch electrodes in the second touch electrode array, and a second end of each second touch signal line is electrically connected to the integrated circuit.

In some optional implementations, each first touch electrode is correspondingly connected to the first ends of two first touch signal lines, and the first ends of two first touch signal lines correspondingly connected to the same first touch electrode are respectively electrically connected to two opposite ends of the first touch electrode in the second direction. In this way, an electrical signal is provided to the first touch electrode through two first touch signal lines or an electrical signal detected by the first touch electrode is received through two first touch signal lines, so that the response speed of the first touch electrode is improved, thereby improving the touch detection sensitivity of the touch display panel.

In addition, in the touch display panel of the embodiments of the present application, the first touch electrodes may be touch driving electrodes and the second touch electrodes may be touch sensing electrodes; or the first touch electrodes may be touch sensing electrodes and the second touch electrodes may be touch driving electrodes. The touch driving electrodes and the touch sensing electrodes are cross-arranged to form a plurality of capacitors for detecting touch positions. The touch position of a finger can be determined by applying touch scan signals to the touch driving electrodes and collecting charge variations on the touch sensing electrodes.

Referring to FIG. 10, FIG. 10 is a schematic structural diagram of a touch display panel according to an embodiment of the present application.

In FIG. 10, the touch display panel includes an array substrate 1010 and a color film substrate 1020 disposed opposite to the array substrate 1010. A touch driving electrode array including a plurality of touch driving electrodes 1011 may be disposed on the array substrate 1010, and a touch sensing electrode array including a plurality of touch sensing electrodes 1021 may be disposed on the color film substrate 1020.

In some optional implementations, the touch sensing electrode array may be disposed on a side of the color film substrate 1020 away from the array substrate 1010 (as shown in FIG. 10, the touch sensing electrode array is disposed on an upper surface of the color film substrate 1020), and the touch driving electrode array may be disposed on a side of the array substrate 1010 facing toward the color film substrate 1020.

In addition, in the touch display panel of the present application, a plurality of scan lines S1 to Sm and data lines T1 to Tn that intersect the scan lines S1 to Sm are further formed on the array substrate. The scan lines S1 to Sm and the data lines T1 to Tn intersect to form a pixel array.

The scan lines S1 to Sm may extend along the first direction D1, and the data lines T1 to Tn may extend along the second direction D2. That is to say, in the touch display panel of this embodiment, the extension direction of the touch driving electrodes 1011 may be the same as that of the data lines T1 to Tn, and the extension direction of the touch sensing electrodes 1021 may be different from that of the scan lines S1 to Sm.

The touch display panel of the present application further includes an integrated circuit 1012, a plurality of touch scan signal lines 1013, and a plurality of touch sensing signal lines 1022.

One end of each touch scan signal line 1013 is correspondingly connected to a touch driving electrode 1011, and the other end of the touch scan signal line 1013 is connected to the integrated circuit 1012. Similarly, one end of each touch sensing signal line 1022 is correspondingly connected to a touch sensing electrode 1021, and the other end of each touch sensing signal line 1022 is connected to the integrated circuit 1012. Because the touch sensing signal lines 1022 are disposed on the color film substrate 1020 and the integrated circuit 1012 is disposed on the array substrate 1010, the touch sensing signal lines 1022 may be electrically connected to the integrated circuit 1012 by using, for example, a flexible circuit board (FPC) 1023 connected between the touch sensing signal lines 1022 and the integrated circuit 1012.

The integrated circuit 1012 may be used for providing a touch scan signal to each touch driving electrode 1013 and receiving a touch sensing signal of each touch sensing electrode 1021 in a touch period. For example, in the touch period, the integrated circuit 1012 sequentially provides a touch scan signal to each touch driving electrode 1013, and receive touch sensing signals of all the touch sensing electrodes 1021. The touch position may be determined based on different touch sensing signals sent by the touch sensing electrodes 1021 to the integrated circuit 1012.

In some optional implementations, in the touch display panel of the present application, the touch sensing signal line 1022 may be disposed in the same conductor layer as the touch sensing electrode 1021. Alternatively, in some other optional implementations, the touch sensing signal line may be disposed in different conductor layers from the touch sensing electrode. In this case, the touch sensing signal lines may be electrically connected to the touch sensing electrodes by means of direct contact, or by means of through holes formed in an insulation layer between the conductor layer where the touch sensing signal line is located and the conductor layer where the touch sensing electrode is located.

In some optional implementations, in the touch display panel of the present application, each touch driving electrode 1013 may be reused as a common electrode in a display period. In these optional implementations, the integrated circuit 1012 may be further used for providing a common voltage signal to each touch driving electrode 1013 in the display period, so that liquid crystal molecules formed in a liquid crystal layer (not shown in the figure) between the array substrate 1010 and the color film substrate 1020 may deflect under the action of an electrical field formed by the common electrode and the pixel electrodes, thereby achieving the displaying of predetermined pictures.

Figure 11:
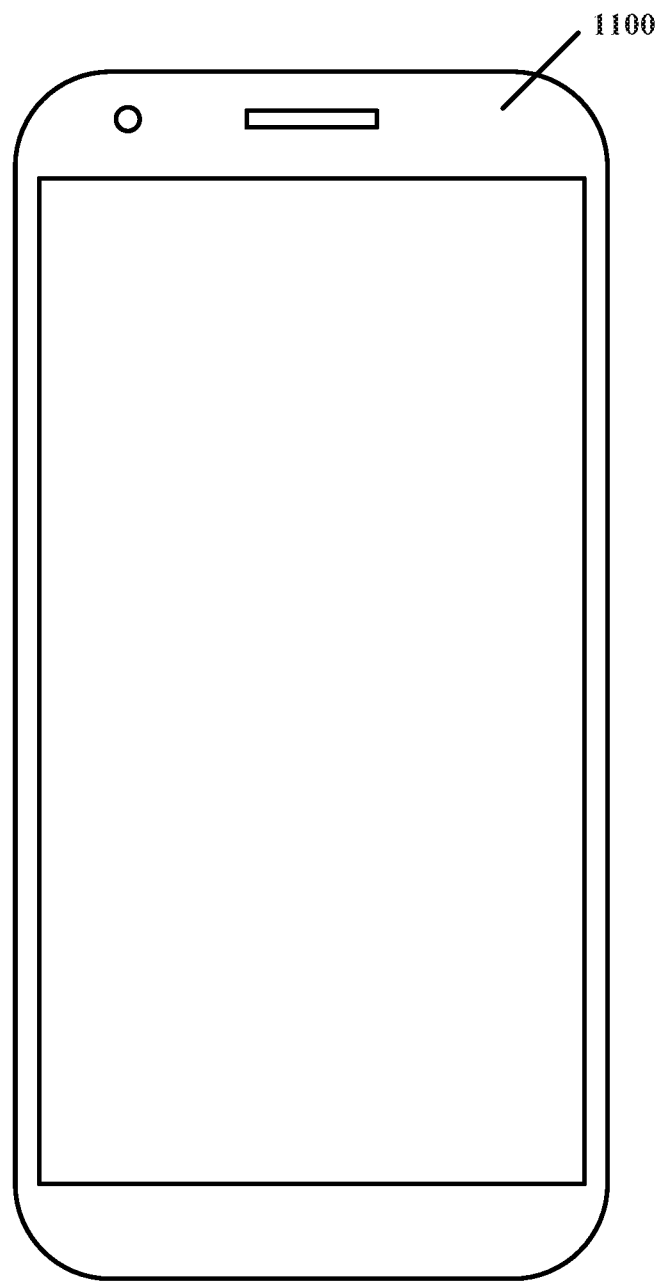
FIG. 11 is a schematic diagram of a display device according to an embodiment of the present application.

The present application also discloses a touch display device, as shown in FIG. 11. The touch display device 1100 may include the above-mentioned touch display panel. It should be appreciated by those skilled in the art that in addition to the above-mentioned touch display panel, the touch display device may further include other well-known structures. Such well-known structures will not be described in further detail so as to avoid obscuring the focus of the present application.

The touch display device of the present application may be any device including the above-mentioned touch display panel, including, but not limited to, a cellular mobile phone 1100 shown in FIG. 11, a tablet computer, a display of a computer, a display applied to a smart wearable device, a display device applied to a transportation vehicle such as an automobile, and so on. Any touch display device including the structure of the touch display panel disclosed by the present application shall be construed as falling within the protection scope of the present application.

It should be appreciated by those skilled in the art that the scope of the present application is not limited to the technical solutions formed by specific combinations of the above-mentioned technical features, but also cover other technical solutions formed by any combinations of the above-mentioned technical features or equivalent features thereof without departing from the concept of the present invention, such as, technical solutions formed by replacing the above-mentioned features with technical features with similar functions as (but not limited to) those disclosed in the present application.

What is claimed is:

1. A touch display panel, comprising:
   a first touch electrode array, comprising M first touch electrodes including $1^{st}$ to $M^{th}$ first touch electrodes arranged along a first direction, wherein the M first touch electrodes each being a strip-shaped electrode and extend along a second direction, and M is an integer larger than 2; and
   a second touch electrode array, comprising N second touch electrodes including $1^{st}$ to $N^{th}$ second touch electrodes arranged along the second direction, wherein the N second touch electrodes each extend along the first direction,
   each of the first touch electrodes comprising a first connection portion extending along the second direction, and each of the $2^{nd}$ to $M^{th}$ first touch electrodes further comprising a plurality of first electrode blocks;
   the first electrode blocks in any one of the $2^{nd}$ to $M^{th}$ first touch electrodes being formed on a same side of the first connection portion of the any one of the $2^{nd}$ to $M^{th}$ first touch electrodes; and
   an orthographic projection of each of the first electrode blocks on the second touch electrode array at least partially overlapping at least two second touch electrodes;
   wherein each of the $1^{st}$ to $(M-1)^{th}$ first touch electrodes further comprises a plurality of second electrode blocks; and
   for a same one of the $2^{nd}$ to $(M-1)^{th}$ first touch electrodes, each of the first electrode blocks and an adjacent one of the second electrode blocks are arranged on opposite sides of the first connection portion and are arranged unsymmetrical with respect to the first connection portion.

2. The touch display panel according to claim 1, wherein the first electrode block and the second electrode block are congruent, and are of a first shape; and
   the first shape comprises any one of a rectangle, an arc, a triangle, and a trapezoid.

3. The touch display panel according to claim 2, wherein
the first electrode block has a first edge extending along the second direction and joined to the first connection portion;
the second electrode block has a second edge extending along the second direction and joined to the first connection portion; and
a length of the first edge is equal to a length of the second edge.

4. The touch display panel according to claim 1, wherein
in the first touch electrode array, one second electrode block of the $(i+1)^{th}$ first touch electrode is formed between any two neighboring first electrode blocks of the $i^{th}$ first touch electrode, wherein i is an integer, and $1 \leq i \leq M-1$; and
one first electrode block of the $(j-1)^{th}$ first touch electrode is formed between any two neighboring second electrode blocks of the $j^{th}$ first touch electrode, wherein j is an integer, and $2 \leq j \leq M$.

5. The touch display panel according to claim 1, wherein
each of the second touch electrodes comprises a second connection portion, and each of the $2^{nd}$ to $N^{th}$ second touch electrode further comprises a third electrode block;
the third electrode block of any one of the $2^{nd}$ to $N^{th}$ second touch electrodes is formed on a same side of the second connection portion of the any one of the $2^{nd}$ to $N^{th}$ second touch electrodes; and
an orthographic projection of the third electrode block on the first touch electrode array at least partially overlaps at least two first touch electrodes.

6. The touch display panel according to claim 5, wherein
each of the $1^{st}$ to $(N-1)^{th}$ second touch electrodes further comprises a plurality of fourth electrode blocks; and
in the $2^{nd}$ to $(N-1)^{th}$ second touch electrodes, the third electrode block and the fourth electrode blocks of a same second touch electrode are located on opposite sides of the second connection portion of the same second touch electrode.

7. The touch display panel according to claim 6, wherein
the third electrode block and the fourth electrode block are congruent, and are of a first shape.

8. The touch display panel according to claim 7, wherein
the third electrode block has a third edge extending along the first direction and joined to the second connection portion;
the fourth electrode block has a fourth edge extending along the first direction and joined to the second connection portion; and
a length of the third edge is equal to a length of the fourth edge.

9. The touch display panel according to claim 6, wherein
one fourth electrode block of the $(k-1)^{th}$ second touch electrode is formed between any two neighboring third electrode blocks of the $k^{th}$ second touch electrode, wherein k is an integer, and $2 \leq k \leq N$; and
one third electrode block of the $(p+1)^{th}$ second touch electrode is formed between any two neighboring fourth electrode blocks of the $p^{th}$ second touch electrode, wherein p is an integer, and $1 \leq p \leq N-1$.

10. The touch display panel according to claim 8, wherein
at least one of the first electrode block, the second electrode block, the third electrode block, and the fourth electrode block is a metal mesh electrode.

11. The touch display panel according to claim 10, wherein
the first connection portion is a metal mesh electrode, and the first connection portion is disposed at a same layer as the first electrode block and the second electrode block; and/or
the second connection portion is a metal mesh electrode, and the second connection portion is disposed at a same layer as the third electrode block and the fourth electrode block.

12. The touch display panel according to claim 11, wherein
the first electrode block and the second electrode block have a width d along the first direction, a sum of the width d and a width of the first connection portion along the first direction is L, a length of the first edge is S, and S=L, and d=(2/3)L.

13. The touch display panel according to claim 10, wherein the first connection portion and the second connection portion are metal wires.

14. The touch display panel according to claim 13, wherein
the first electrode block and the second electrode block have a width d' along the first direction, a length of the first edge is S', and
d'=S'.

15. The touch display panel according to claim 1, wherein
the first touch electrode is a touch sensing electrode, and the second touch electrode is a touch transmitting electrode.

16. The touch display panel according to claim 15, further comprising a plurality of first touch signal lines, a plurality of second touch signal lines, and an integrated circuit, wherein
a first end of each of the first touch signal lines is correspondingly connected to one of the first touch electrodes in the first touch electrode array, and a second end of each of the first touch signal lines is electrically connected to the integrated circuit; and
a first end of each of the second touch signal lines is correspondingly connected to one of the second touch electrodes in the second touch electrode array, and a second end of each of the second touch signal lines is electrically connected to the integrated circuit.

17. The touch display panel according to claim 16, wherein
each of the first touch electrodes is correspondingly connected to the first ends of two first touch signal lines; and
the first ends of two first touch signal lines correspondingly connected to a same first touch electrode are respectively electrically connected to two opposite ends of the first touch electrode in the second direction.

18. A touch display device, comprising a touch display panel, the touch display panel comprising:
a first touch electrode array, comprising M first touch electrodes including $1^{st}$ to $M^{th}$ first touch electrodes arranged along a first direction, wherein the M first touch electrodes each being a strip-shaped electrode and extend along a second direction, and M is an integer larger than 2; and
a second touch electrode array, comprising N second touch electrodes, including $1^{st}$ to $N^{th}$ second touch electrodes arranged along the second direction, wherein the N second touch electrodes each extend along the first direction, each of the first touch electrodes comprising a first connection portion extending along the second direction, and each of the $2^{nd}$ to $M^{th}$ first touch electrodes further comprising a plurality of first electrode blocks;

the first electrode blocks in any one of the $2^{nd}$ to $M^{th}$ first touch electrodes formed on a same side of the first connection portion of the any one of the $2^{nd}$ to $M^{th}$ first touch electrodes; and an orthographic projection of each of the first electrode blocks on the second touch electrode array at least partially overlapping at least two second touch electrodes;

wherein each of the $1^{st}$ to $(M-1)^{th}$ first touch electrodes further comprises a plurality of second electrode blocks; and for a same one of the $2^{nd}$ to $(M-1)^{th}$ first touch electrodes, each of the first electrode blocks and an adjacent one of the second electrode blocks are arranged on opposite sides of the first connection portion and are arranged unsymmetrical with respect to the first connection portion.

19. The touch display panel according to claim 1, wherein an orthographic projection of each of the second electrode blocks on the second touch electrode array at least partially overlapping at least two second touch electrodes;

for a same one of the $2^{nd}$ to $(M-1)^{th}$ first touch electrodes, the at least two second touch electrodes overlapped by the orthographic projection of each of the first electrode blocks differs from the at least two second touch electrodes overlapped by the orthographic projection of an adjacent one of the second electrode blocks.

* * * * *